United States Patent [19]

Takenoshita et al.

[11] Patent Number: 5,115,749
[45] Date of Patent: May 26, 1992

[54] METHOD OF ATTAINING UNIFORM FLOW IN ELONGATED FLUIDIZED BED FURNACE

[75] Inventors: Hidamitsu Takenoshita; Hisashi Hattori; Yoichiro Hanada, all of Osaka, Japan

[73] Assignee: Kabushiki Kaisha Komatsu Seisakusho, Japan

[21] Appl. No.: 714,994

[22] Filed: Jun. 14, 1991

Related U.S. Application Data

[63] Continuation of Ser. No. 496,110, Mar. 19, 1990, abandoned, which is a continuation of Ser. No. 295,597, filed as PCT/JP88/00281, Mar. 17, 1988, abandoned.

[30] Foreign Application Priority Data

Mar. 17, 1987 [JP] Japan ................... 62-060189

[51] Int. Cl.⁵ ................................................ F22B 1/02
[52] U.S. Cl. ..................................... 110/245; 432/58; 432/15; 122/4 D; 110/341
[58] Field of Search .......... 110/245, 341; 122/4 D; 432/15, 58

[56] References Cited

U.S. PATENT DOCUMENTS

| | | |
|---|---|---|
| 3,659,559 | 5/1972 | Foldes et al. |
| 4,167,819 | 9/1979 | Ebeling, Jr. et al. |
| 4,203,804 | 5/1980 | Janning et al. ............... 110/245 |
| 4,270,468 | 6/1981 | Robinson et al. ............. 110/245 |
| 4,330,502 | 5/1985 | Engstrom ..................... 110/245 |
| 4,377,119 | 3/1983 | Noack ......................... 110/245 |
| 4,378,206 | 3/1983 | Kullendorff et al. ........... 432/58 |
| 4,397,102 | 8/1983 | Gamble et al. ................. 432/58 |
| 4,598,653 | 7/1986 | Stringfellow ................. 110/245 |
| 4,616,426 | 10/1986 | Large ......................... 432/58 |
| 4,784,533 | 11/1988 | Teigen ........................ 110/245 |

*Primary Examiner*—Henry C. Yuen
*Attorney, Agent, or Firm*—Ronald P. Kananen

[57] ABSTRACT

A method of attaining a uniform flow in an elongated fluidized bed furnace, used for the purpose of preventing the expansion and uniting of bubbles in the fluidized bed, and setting the fluidized bed in a uniform flow state, so as to keep the flow condition of the bubbles excellent at all times. The purpose of this method can be achieved by withdrawing a fluidized gas from an arbitrary portion of a fluidized bed (13) through a fluidization gas venting or purging means (A).

8 Claims, 6 Drawing Sheets

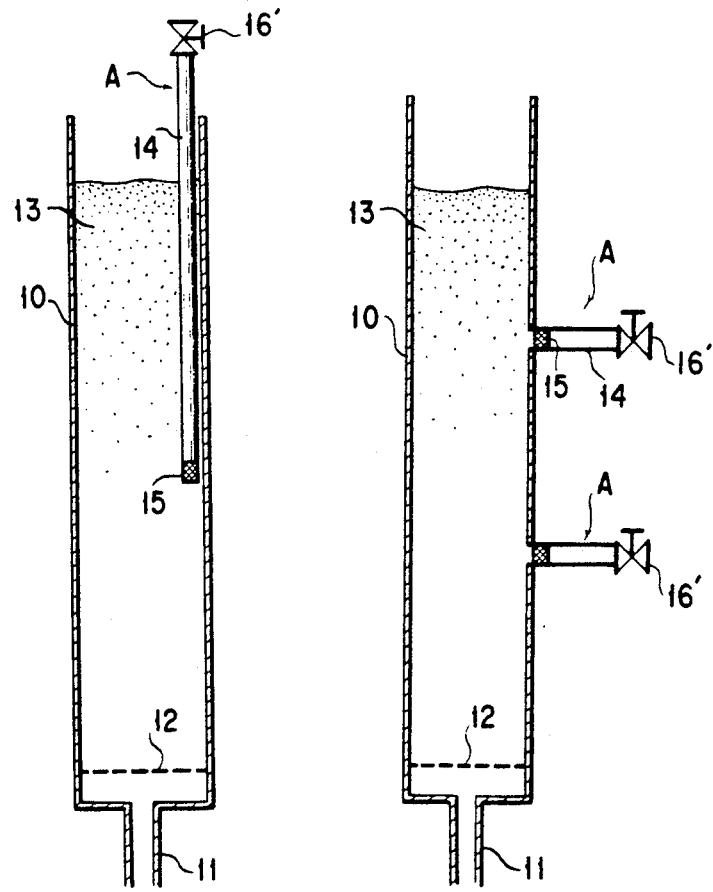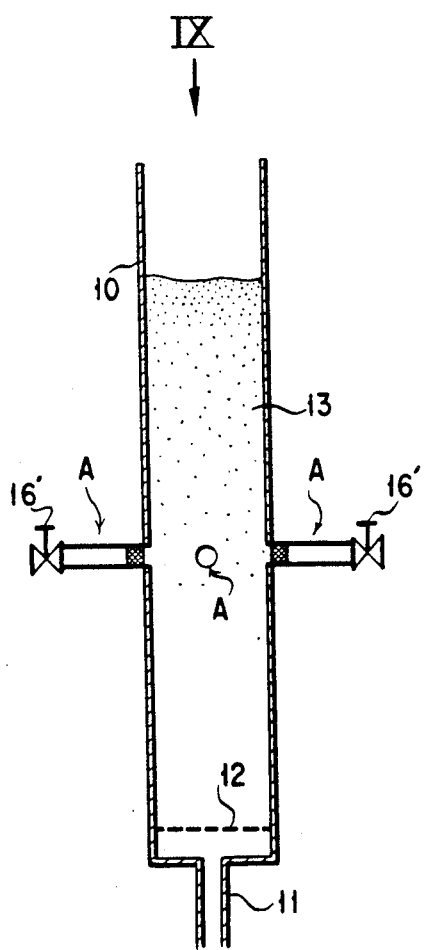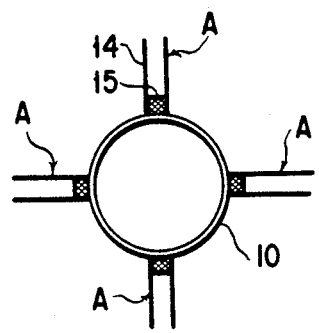

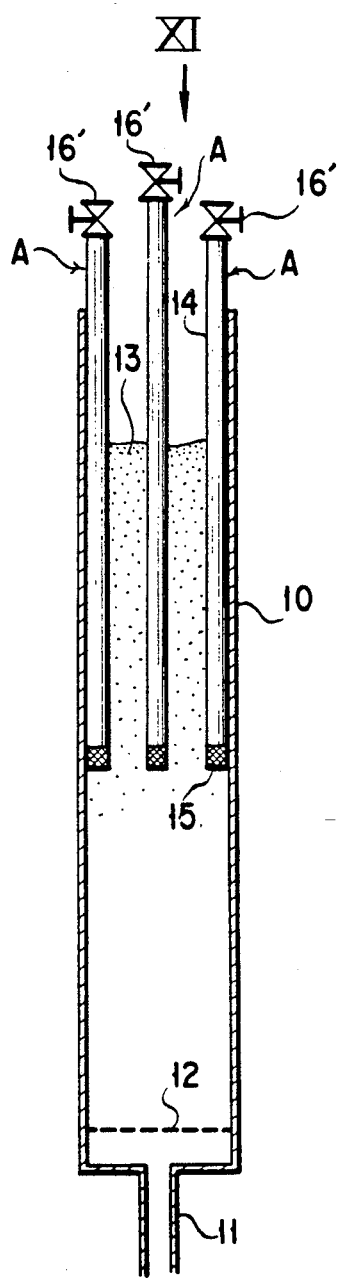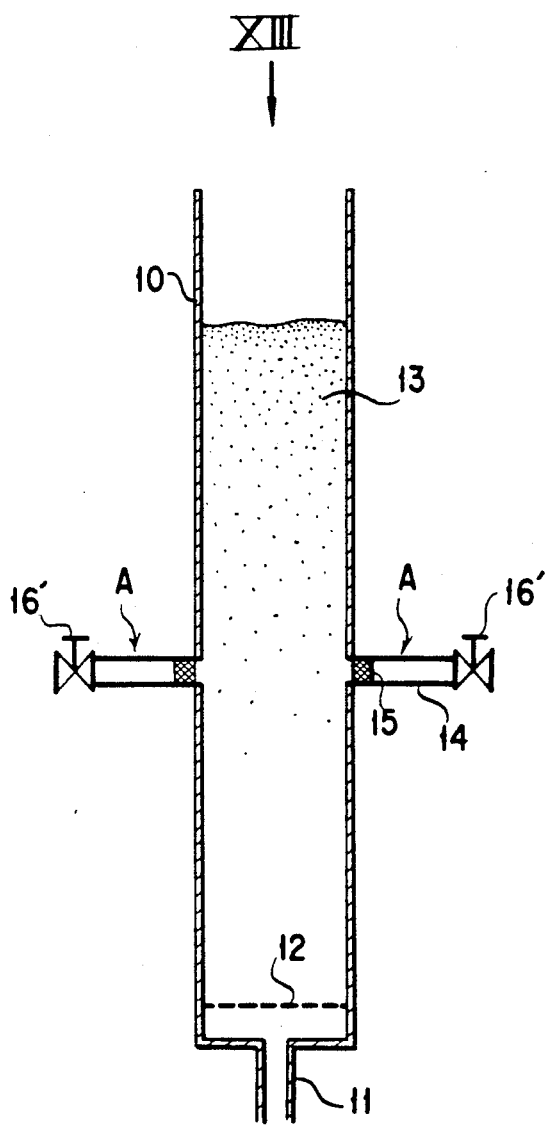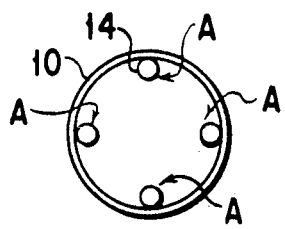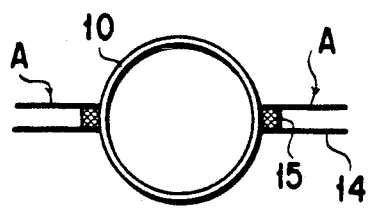

METHOD OF ATTAINING UNIFORM FLOW IN ELONGATED FLUIDIZED BED FURNACE

This application is a continuation of application Ser. No. 07/496,110 filed Mar. 19, 1990, which is a continuation of application Ser. No. 07/295,597 filed on Nov. 14, 1988, now both abandoned.

ART FIELD OF THE INVENTION

This invention relates to a method of attaining uniform flow in an elongated fluidized bed furnace used for such purposes as thermal treatment of metals or removal of organic materials.

BACKGROUND ART OF THE INVENTION

The depth of the prior art elongated fluidized bed furnace is 1 mm at most in Japan and 2 mm at most in other countries.

With a furnace having an excessive depth, the state of flow varies depending on the depth due to such causes as the pressure difference between top and bottom portions of the fluidized bed of the furnace and joining of bubbles.

(1) When the rate of flow of flowable gas is low

Although there is an apparently satisfactory state of flow of bubbles in a top portion of the fluidized bed, there is no substantial flow in a bottom portion of the bed because of a small volume of bubbles.

(2) When the rate of flow of flowable gas is increased

Flow tends to be produced in a bottom portion of the fluidized bed. In a top portion of the bed, however, joining of bubbles to one another takes place to produce a state of considerably strong flow. With a furnace having a small diameter, there is produced a slug flow state occupied by gas slug over the entirety of a certain furnace height range.

(3) When the rate of flow of flowable gas is further increased

Slug flow tends to be produced even in a bottom portion of the fluidized bed. In a top portion of the bed, a more violent slug flow is produced, and the top surface of the bed is violently moved up and down with the rise of gaseous slug.

A satisfactory state of flow in the fluidized bed is a bubble flow. Where the state of flow is different between the top and bottom portions of the fluidized bed as in the cases (1) to (3) described above, the following problems are presented:

(1) The temperature uniformity of the fluidized bed is deteriorated.

(2) It is difficult to obtain a uniform atmosphere in the bed.

(3) Usually, elongated objects to be processed are inserted into the fluidized bed by a hanging system. When the flow in the top portion of the bed becomes violent, it becomes difficult to hold the object being processed in a vertically fixed position due to a rise of the and bubbles.

(4) When a slug flow is produced, the top surface of the fluidized bed is displaced up and down, and powder used for the fluidized bed, e.g., alumina, is spattered.

SUMMARY OF THE INVENTION

The present invention has been intended in light of the above circumstances, and its object is to provide a method of attaining a uniform flow in an elongated fluidized bed furnace, which can prevent extensive joining-together of bubbles and maintain a uniform flow state in the fluidized bed to be able to maintain a satisfactory state of bubble flow at all times.

To attain the above object of the invention, there is provided a method of attaining a uniform flow in an elongated fluidized furnace, in which fluidization of the fluidized bed is obtained by producing a bubble flow by passing flowable gas through the fluidized bed, wherein the flowable gas is purged to the outside of the furnace from a portion of said fluidized bed by using means for flowable gas purging.

The above and other objects, forms and advantages of the invention will become more apparent to those skilled in the art from the following description, in which preferred modes of the invention are shown as embodiments, and also the accompanying drawings.

BRIEF DESCRIPTION OF THE INVENTION

FIGS. 6 to 8 are schematic vertical sectional views showing respective different arrangements of flowable gas purging in an elongated fluidized bed furnace;

FIG. 9 is a view taken in the direction of arrow IX in FIG. 8;

FIGS. 10, 12, 14 and 16 are schematic vertical sectional views showing respective further arrangements of the means for flowble gas purging in an elongated fluidized bed furnace;

FIGS. 11, 13, 15 and 17 are respective views taken in the directions of arrows XI in FIG. 10, XIII in FIG. 12, XV in FIG. 14 and XVII in FIG. 16;

Figure 20:
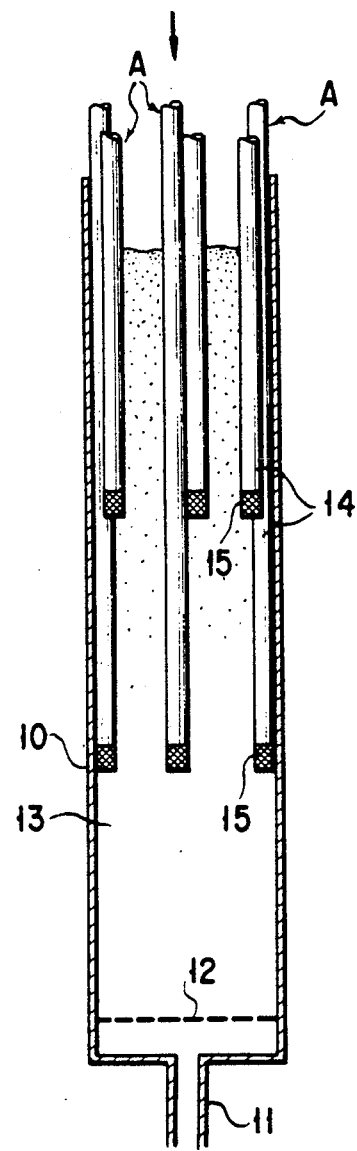
Figure 21:
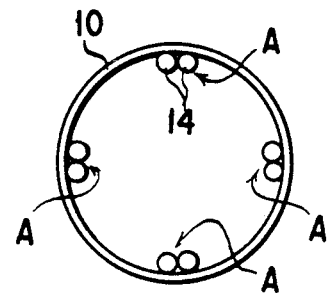

FIG. 20 a schematic vertical sectional view showing a still further arrangement of the means for flowable gas purging in an elongated fluidized bed furnace; and FIG. 21 is a view taken in the direction of arrow XXI in FIG. 20.

DETAILED DESCRIPTION OF THE PREFERRED EMBODIMENTS

Figure 1:
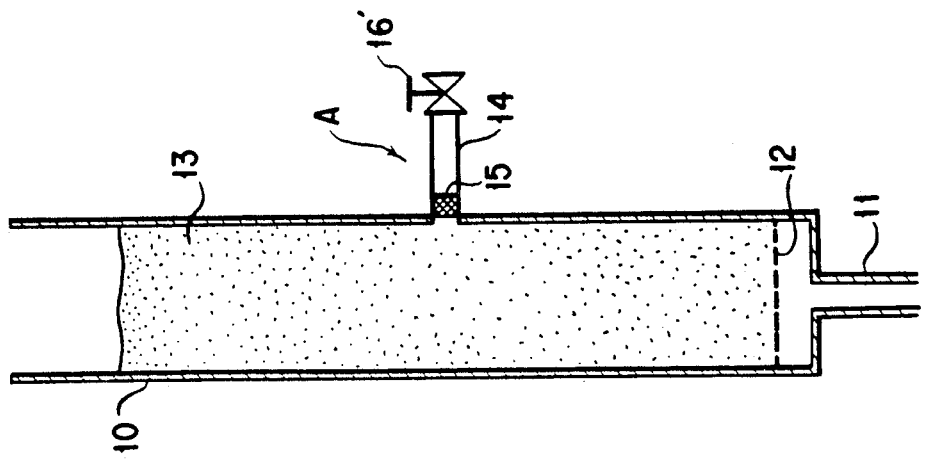
FIG. 1 is a schematic vertical sectional view for explaining the structure of an elongated fluidized bed surface for carrying out the method according to the invention.

FIG. 1 is a schematic vertical sectional view showing an elongated fluidized bed furnace used for carrying out the method according to the invention. In FIG. 1, reference numeral 10 designates an elongated fluidized bed furnace. The furnace has its bottom surface provided with a flowable gas inlet 11. A dispersing plate 12 is provided in the furnace 10 near the bottom wall. Powdery alumina is accommodated in the furnace 10, and constitutes a fluidized bed. Designated at A in FIG. 1 is means for flowable gas purging. The purging means A includes a gas-purging pipe 14, which is provided at a position corresponding to a substantially central portion of the fluidized bed 13 and communicates with the furnace 10. The gas-purging pipe 14 has a filter 15 provided at its inlet. The outlet of the gas-purging pipe 14 is connected to the inlet of a valve 16', the outlet of which is in a nearly atmospheric state.

The filter 15 may consist of a porous sintering with pores of diameters of, for instance, 1 mm or less.

The operation will now be described.

A process object (not shown) is accommodated in the fluidized bed 13, and flowable gas is blown into the furnace 10 through the flowable gas inlet 11. The supplied flowable gas is dispersed by the dispersing plate 12 to rise as bubbles 16 through the fluidized bed 13.

Before bubbles 16, which are initially generated in a bottom portion of the fluidized bed 13 under a high pressure and are rising, expandingly join together, the vavle 16' of the purging means A for flowable gas purging is opened to let a portion of the flowable gas in the fluidized bed 13 be purged through the filter 15 and the purging pipe 14 to the outside of the fluidized bed.

Figure 3:
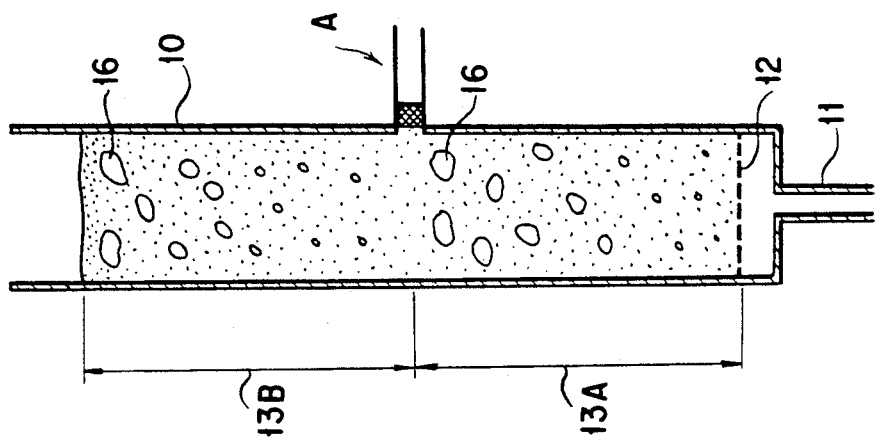
FIG. 3 is a schematic vertical sectional view for explaining the operation of the elongated fluidized bed surface for carrying out the method according to the invention.
Figure 2:
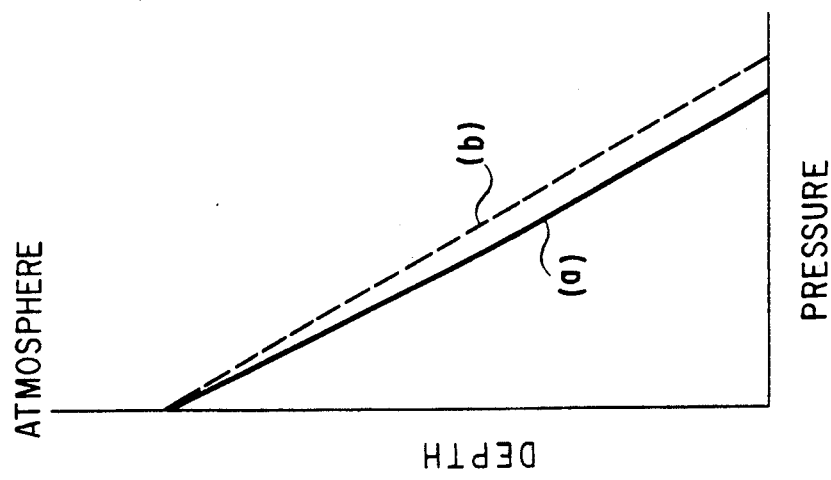
FIG. 2 is a graph showing a pressure distribution in a fluidized bed.

In consequence, the slope angle (a) of the pressure distribution of the flowable gas in the fluidized bed 13 becomes smaller than the slope angle (b) in the case of absence of gas purging, and the fluidized bed 13 is divided between lower and upper portions 13A and 13B with respect to the position of the purging means A for flowable gas purging as shown in FIG. 3. That is, the flow of bubbles 16 in the lower portion 13A of the fluidized bed 13 becomes substantially equal to the flow of bubbles in the upper portion 13B. In this way, joining of bubbles 16 into large bubbles is prevented to obtain a uniform state of flow in both the upper and lower portions of the fluidized bed 13.

Figure 4:
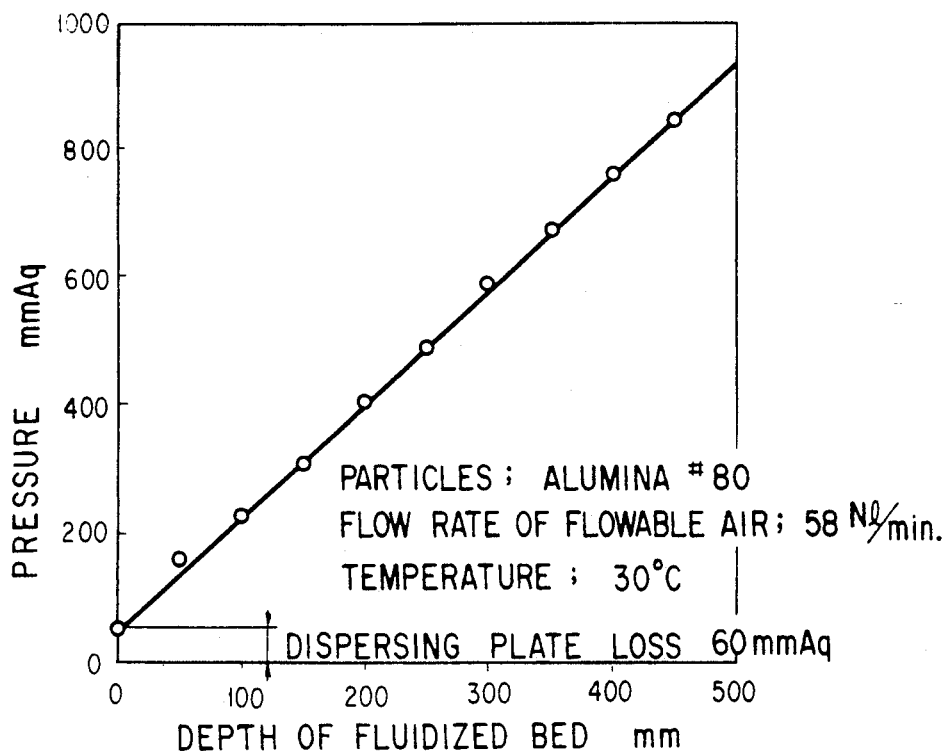
FIG. 4 is a graph showing the relation between the pressure in and depth of a fluidized bed when there is a flow.
Figure 5:
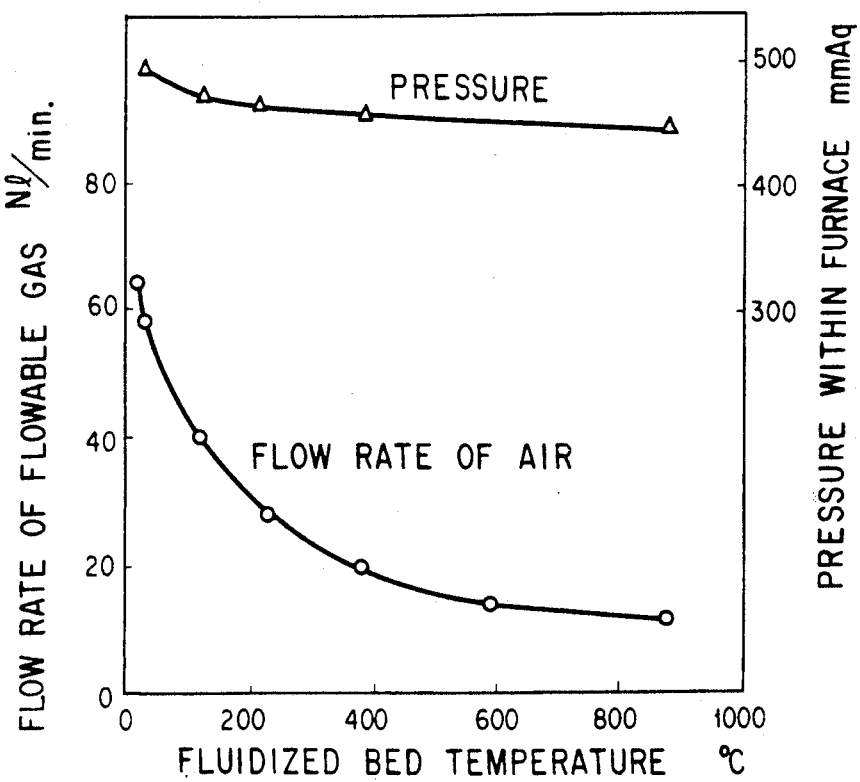
FIG. 5 is a graph showing the relationship among the fluidized bed temperature, rate of flow of flowable gas and surface temperature.

FIGS. 4 and 5 show characteristics of the fluidized bed.

FIG. 4 shows the relation between the pressure necessary for fluidization in the fluidized bed and depth thereof.

The pressure necessary for fluidization is substantially proportional to the depth of the fluidized bed.

The value which is obtained by subtracting the dispersing plate loss from the measured value is applicable to the fluidized bed furnace using #80 alumina particles.

FIG. 5 shows the relationship among the fluidized bed temperature, rate of flow of flowable gas and furnace pressure.

As shown in FIG. 6, the gas-purging pipe 14 of the purging means A for flowable gas purging may be inserted into the fluidized bed 13 from above the bed 13.

In this case, the position of gas purging may be changed as desired although the effective area in the furnace 10 may be reduced.

Where the depth of the fluidized bed 13 is increased, as shown in FIG. 7, two, i.e., upper and lower purging means A for flowable gas purging are provided along the vertical direction of the furnace 10.

The criterion of the adequate interval of the arrangement of the positions of flowable gas purging is substantially 1 m.

The gas-purging pipe 14 of the purging means A for flowable gas purging may be mounted in other ways than the above cases as well, for instance as shown in FIGS. 8 to 21.

(1) Where gas purging is done at four positions at one level

As shown in FIGS. 8 and 9, four gas-purging ports of the gas-purging pipes 14 of the four purging means "A" for flowable gas purging are disposed along a circumference of the furnace 10 and are positioned at a substantially intermediate portion in the axial direction of the furnace 10 at intervals of 90°. Also, as shown in FIGS. 10 and 11, four gas-purging pipes 14 of the four purging means "A" for flowable gas purging are inserted into the fluidized bed 13 from the top of the furnace 10 so as to dispose the gas-purging ports at a substantially intermediate portion in the axial direction of the furnace 10.

Figure 18:
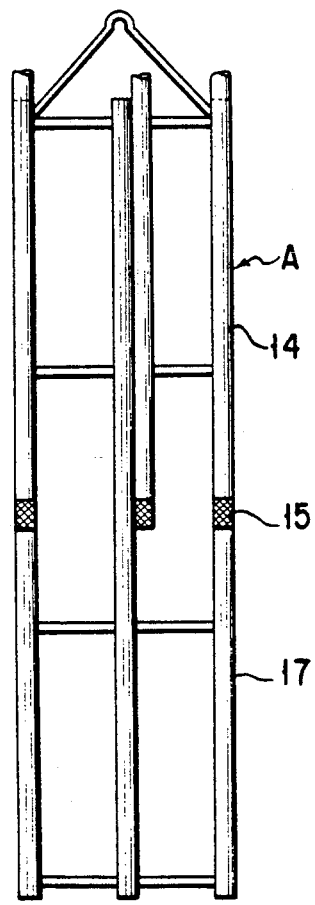
FIG. 18 is a schematic elevational view showing a gas-purging pipe arrangement mounted on a thermal treatment member.
Figure 19:
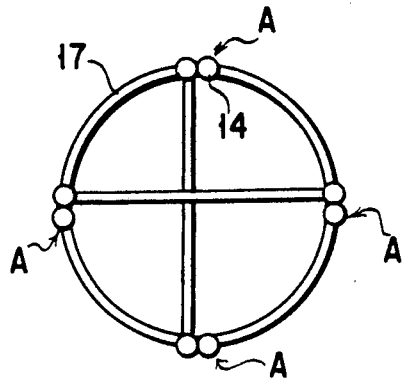
FIG. 19 is a view taken in the direction of arrow XIX in FIG. 18.

In case of the latter, as shown in FIGS. 18 and 19, the gas-purging pipes 14 can be attached to a jig 17 for thermal treatment.

(2) Where gas purging is done at two positions at one level

Figure 14:
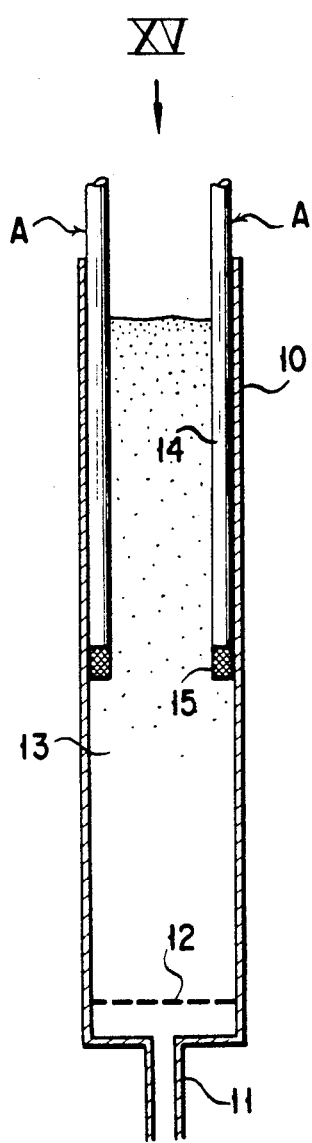
Figure 15:
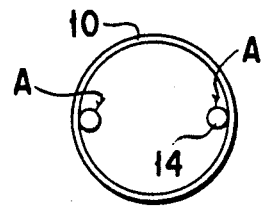

As shown in FIGS. 12 and 13, gas-purging ports of the gas-purging pipes 14 of the two purging means "A" for flowable gas purging are disposed along a circumference of the furnace 10 and are positioned at a substantially intermediate portion in the axial direction of the furnace 10 at intervals of 180°. Also, as shown in FIGS. 14 and 15, gas-purging pipes 14 of the two purging means "A" for flowable gas purging are inserted into the fluidized bed 13 from the top of the furnace 10 so as to dispose the gas-purging ports at a substantially intermediate portion in the axial direction of the furnace 10.

(3) Where gas purging is done at four positions at each of two different levels

Figure 16:
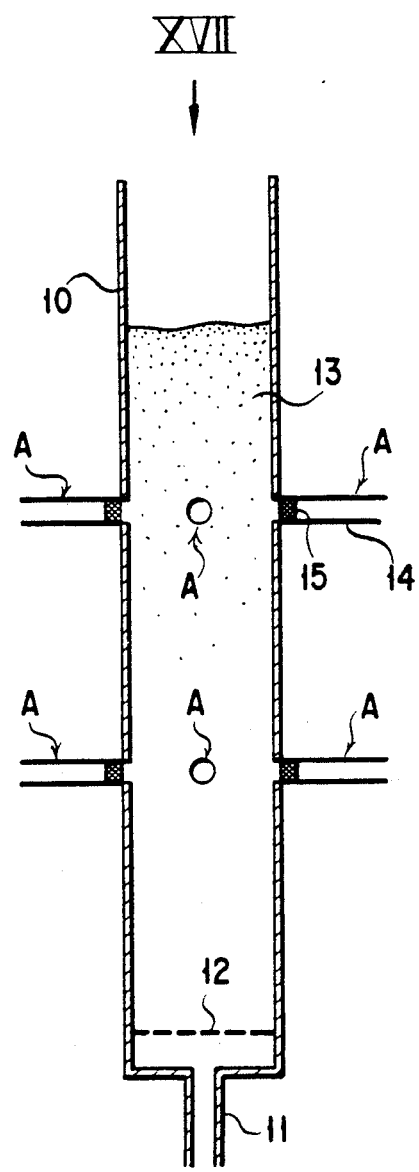
Figure 17:
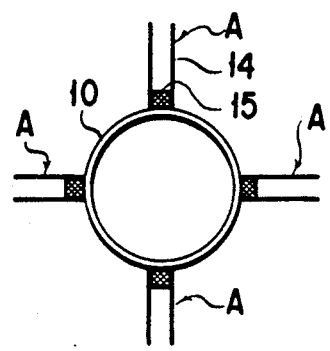

As shown in FIGS. 16 and 17, four gas-purging ports of gas-purging pipes 14 of four purging means "A" for flowable gas purging are disposed at each of two portions of the furnace 10 at different levels in the axial direction of the furnace 10 at intervals of 90°.

As shown in FIGS. 20 and 21, four sets of gas-purging pipes 14 of purging means "A" for flowable gas purging, each set consisting of two, i.e., short and long, gas-purging pipes 14, are inserted into the fluidized bed 13 from above. As will be understood from the foregoing detailed description, while flowable gas blown into the fluidized bed from the bottom thereof rises while joining to one another into large bubbles, the bubbles are reduced suddenly at the position at which the purging means for flowable gas purging is provided, and from that position the gas rises again as small bubbles. By increasing the number of purging means for flowable gas purging, the phenomenon noted above takes place at an increased number of positions of gas purging. Thus, it is possible to prevent joining of bubbles to one another into large bubbles and maintain the state of bubble flow, so that the fluidized bed can be held in a uniform flow state.

What is claimed is:

1. A method for attaining uniform flow in an elongated fluidized bed furnace having a fluidized bed therein, comprising the steps of:
    fluidizing said fluidized bed in said furnace by producing a flow of bubbles therein by passing a flowable fluidizing gas from an inlet outside said furnace through said fluidized bed wherein said bubbles tend to expand and unite in said fluidized bed while passing therethrough form said inlet to an outlet of said furnace; and
    withdrawing at least a portion of said fluidizing gas from a point intermediate the inlet and the outlet of said furnace, said withdrawing step being carried out by using a fluidizing gas purging means cooperating with said furnace to provide a uniform flow state in said fluidized bed and cause a flow of bubbles in a first portion of said fluidized bed to become substantially equal to a flow of bubbles in a second portion of said fluidized bed, said purging means including a filter through which said portion of fluidizing gas is purged to the outside of the fluidized bed, whereby expansion and uniting of bubbles is prevented at least in a region near said purging means.

2. The method as set forth in claim 1, wherein said purging means includes at least one gas-purging port disposed at a position corresponding to a substantially intermediate portion in the axial direction of said fluidized bed.

3. The method as set forth in claim 1, wherein said purging means includes at least two gas-purging ports provided at positions at two different levels in the axial direction of said fluidized bed.

4. The method as set forth in claim 2, wherein two gas-purging ports are disposed in a horizontal arrangement and at positions at intervals of 180°.

5. The method as set forth in claim 2, wherein said gas-purging ports are provided in a horizontal arrangement at four positions at intervals of 90°.

6. The method as set forth in claim 3, wherein said gas-purging ports are disposed in a horizontal arrangement at four positions at intervals of 90° at each of said two different levels.

7. The method as set forth in claim 1, wherein said step of fluidizing is carried out by dispersing said flowable gas by dispersing plates within said furnace to rise as bubbles through the fluidized bed.

8. The method as set forth in claim 1, wherein the step of withdrawing causes the slope angle of pressure distribution of the flowable gas through the fluidized bed to become smaller than the slope angle in the absence of purging.

* * * * *